United States Patent
Fujita et al.

(10) Patent No.: US 7,653,485 B2
(45) Date of Patent: Jan. 26, 2010

(54) ROUTE GUIDANCE SYSTEM AND METHOD

(75) Inventors: Ryujiro Fujita, Tsurugashima (JP);
Hiroto Inoue, Tsurugashima (JP);
Naohiko Ichihara, Tsurugashima (JP);
Takehiko Shioda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 505 days.

(21) Appl. No.: 11/547,331

(22) PCT Filed: Mar. 15, 2005

(86) PCT No.: PCT/JP2005/005057

§ 371 (c)(1),
(2), (4) Date: Dec. 5, 2006

(87) PCT Pub. No.: WO2005/098366

PCT Pub. Date: Oct. 20, 2005

(65) Prior Publication Data

US 2008/0319640 A1  Dec. 25, 2008

(30) Foreign Application Priority Data

Mar. 31, 2004 (JP) ............................. 2004-106186

(51) Int. Cl.
*G01C 21/34* (2006.01)
(52) U.S. Cl. .................. 701/211; 701/200; 701/208; 382/165; 340/995.24; 340/995.27
(58) Field of Classification Search ................ 701/200, 701/208, 210, 211; 340/995.14, 995.19, 340/995.24, 995.27; 382/154, 224, 162–167
See application file for complete search history.

(56) References Cited

U.S. PATENT DOCUMENTS

2003/0210806 A1* 11/2003 Yoichi et al. ................ 382/104

FOREIGN PATENT DOCUMENTS

| JP | 8-105752 A | 4/1996 |
|---|---|---|
| JP | 9-113291 A | 5/1997 |
| JP | 11-72344 A | 3/1999 |
| JP | 2000-283773 A | 10/2000 |
| JP | 2000-304559 A | 11/2000 |
| JP | 2001-215123 A | 9/2001 |
| JP | 2002-213982 A | 7/2002 |
| JP | 2003-269971 A | 9/2003 |

* cited by examiner

*Primary Examiner*—Thomas G Black
*Assistant Examiner*—Peter D Nolan
(74) *Attorney, Agent, or Firm*—Sughrue Mion, PLLC

(57) ABSTRACT

A routing guide system includes route calculating means for calculating the route of a vehicle to a destination, image providing means for reading from storage means scenery images on the route calculated by the route calculating means, and display means for displaying the scenery images on the calculated route generated by the image providing means. The routing guide system also includes route confirming means for confirming as a set route the route calculated by the route calculating means, according to an operation, during or after display of the scenery images on the calculated route by means of the display means.

13 Claims, 10 Drawing Sheets

| ROAD REGION | |
|---|---|
| DEGREE OF ROAD STRAIGHTNESS | 80 |
| DEGREE OF ROAD SURFACE NICENESS | 70 |
| ROAD WIDTH | 90 |
| DEGREE OF ROAD PLEASANTNESS | 80 |

| | LEFT SCENE REGION | RIGHT SCENE REGION |
|---|---|---|
| FOREST AND SEA RATIO | 90 | 90 |
| LACK OF BILLBOARDS | 80 | 60 |
| DEGREE OF COMPLEXITY | 70 | 85 |
| DEGREE OF SCENE PLEASANTNESS | 80 | 78.3 |

FIG. 11

| ROAD REGION | |
|---|---|
| BLUE SKY RATIO | 100 |
| LACK OF SIGNAGE | 70 |
| DEGREE OF OPENNESS | 80 |
| DEGREE OF BACKGROUND PLEASANTNESS | 83.3 |

ROUTE GUIDANCE SYSTEM AND METHOD

TECHNICAL FIELD

The present invention relates to a routing guide system and method for guiding a vehicle through traveling routes to a destination.

BACKGROUND ART

Navigation systems are already known in the art. In general, map data, including road data acquired by digitizing each point on a road of a map, is stored in a storage device in advance, and a map data group in a predetermined range of area including the current position of the vehicle is read from the storage device while detecting the current position and heading direction of the vehicle using various sensors. Then, the map data group is displayed on a screen of the display device as a map of the area around the current position of the vehicle. A vehicle mark is automatically displayed on the map to indicate the current position and heading direction of the vehicle.

Conventional navigation devices have a function to automatically set the route to the destination. When a route is set, one route is selected out of a plurality of route candidates based on computation considering various conditions, such as the presence of a toll road and the shortest distance, on the routes between the start point, the destination and transit locations, and the selected route is displayed on the map.

However, when conventional navigation systems set the route, that route setting is done with almost no consideration of providing a pleasant drive to the riders, such as the driver. For example, even when the destination is a leisure venue, the route setting is done solely in terms of "movement," and the navigation systems are not able to perform route setting in a way that enables the riders to enjoy scenery and the like while traveling to the leisure venue.

SUMMARY OF THE INVENTION

One object of the present invention is to provide a routing guide system and method that can set a route so that a pleasant drive can be provided to riders in a vehicle.

According to a first aspect of the present invention, there is provided a routing guide system which includes route calculating means for calculating a vehicle route to a destination, storage means for storing data of scenery images of a plurality of location points, image providing means for reading from the storage means scenery images along the route calculated by the route calculating means and generating the scenery images, and display means for displaying the scenery images generated by the image providing means. This routing guide system further includes route confirming (fixing) means that, according to an operation entered by a user, during the display or after the display by the display means of the scenery images along the calculated route, confirms as a set route (decided route) the route calculated by the route calculating means.

According to a second aspect of the present invention, there is provided a routing guide method which includes a route calculating step of calculating a vehicle route to a destination, a step of storing in storage means, data of scenery images of a plurality of location points, an image providing step of reading from the storage means scenery images on the route calculated in the route calculating step and generating the scenery images, a display step of displaying the scenery images prepared by the image providing step, and a route confirming step of confirming as a set route the route calculated in the route calculating step, according to user's instructions or user's operation, during the display or after the display in the display step of the scenery images on the calculated route.

BRIEF DESCRIPTION OF THE DRAWINGS

FIG. 11 is a diagram showing items of the background analysis and degrees of background pleasantness obtained by the analysis;

MODE FOR CARRYING OUT THE INVENTION

Embodiments of the present invention will now be described with reference to the drawings.

Figure 1:
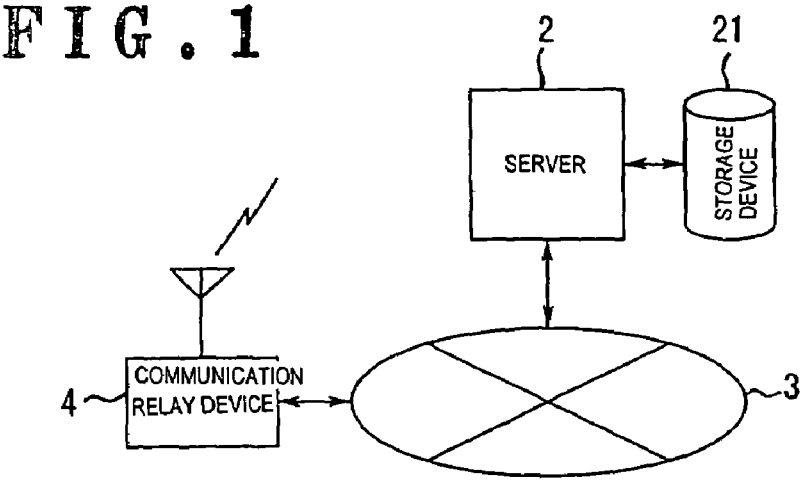
FIG. 1 is a block diagram depicting a general configuration of a routing guide system according to the present invention.

Referring to FIG. 1, the routing guide system of the present embodiment includes a plurality of on-vehicle terminal devices $1_1$ through $1_n$, server 2, network 3 and communication relay device 4. The on-vehicle terminal devices $1_1$ through $1_n$ are connected to the server 2 via the network 3 and the communication relay device 4 so that communication is possible between the on-vehicle terminal devices and the server.

Figure 2:
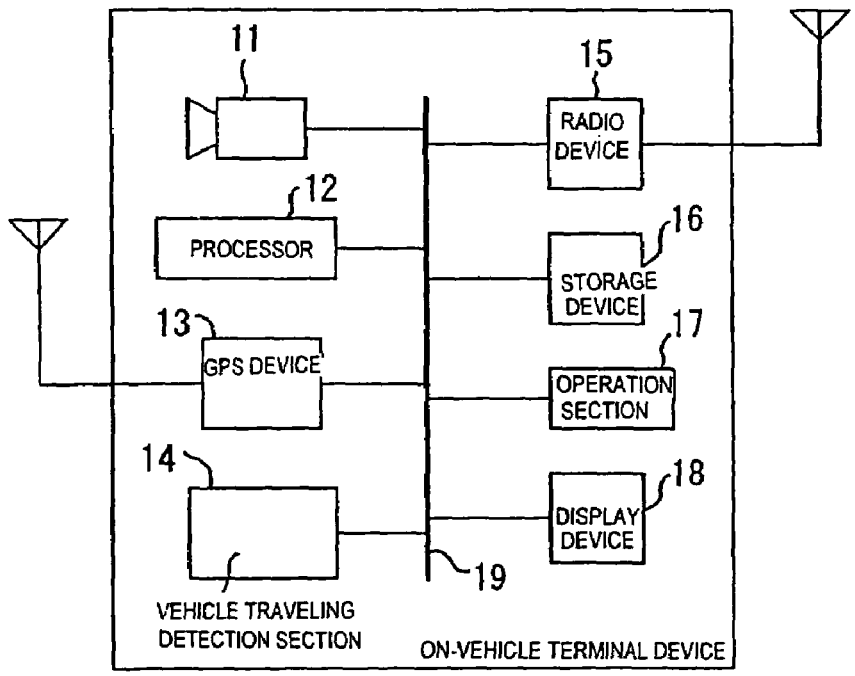
FIG. 2 is a block diagram depicting a configuration of an on-vehicle terminal device.

The on-vehicle terminal devices $1_1$ through $1_n$ are mounted on the vehicles $6_1$ through $6_n$, respectively. As shown in FIG. 2, each on-vehicle terminal device $1_1$ through $1_n$ includes a camera 11, processor 12, GPS (Global Positioning System) device 13, vehicle traveling detection section 14, radio device 15, storage device 16, operation section 17 and display device 18. The camera 11, processor 12, GPS device 13, vehicle traveling detection section 14, radio device 15, storage device 16, operation section 17 and display device 18 are all connected to a bus 19.

The camera 11 is, for example, a CCD camera, and is mounted on the vehicle so as to capture the image in front of the vehicle.

The processor 12 accepts image data supplied from the camera 11 and performs processing to calculate the degree of pleasantness of the scenery shown by the image data. The processor 12, according to the results of the analysis processing, performs scenery image acquisition processing and further performs navigation processing according to the detection outputs of the GPS device 13 and the vehicle traveling detection section 14. Details of the scenery pleasantness degree calculation processing, the scenery image acquisition processing, and the navigation processing will be described later.

The GPS device 13 detects the current position and direction of travel of the vehicle. The vehicle traveling detection section 14 detects the traveling conditions (running conditions) of the vehicle, such as vehicle speed and engine RPMs, for example. The vehicle's current position and direction of travel of the vehicle detected by the GPS device 13 and the various data on the traveling conditions detected by the vehicle traveling detection section 14 are used for the scenery image acquisition processing and the navigation processing by means of the processor 12.

The radio device 15 receives and demodulates the radio signal sent from the server 2 at one occasion, and sends data in the form of radio signal to the server 2 at another occasion.

The storage device 16 includes a hard disk and/or a semiconductor memory. The storage device 16 stores the programs for navigation processing, scenery image acquisition processing and the like which are executed by the processor 12 and also stores data, such as road data for route searching, map data for displaying, and the like.

The operation section 17 includes, for example, a keyboard and supplies to the processor 12, via the bus 19, commands according to operations (instructions) entered by a user. The display device 18 is, for example, a liquid crystal display device and displays a vehicle mark, indicating the current position and direction of travel of a vehicle, along with a map and also displays routes and scenery images calculated by the processor 12.

The server 2 has the storage device 21 and is connected to the network 3. The server 2 executes scenery image control processing to control the image data sent from the on-vehicle terminal devices 1₁ through 1ₙ, using information appended to the image. Upon receiving scenery image requests from any of the on-vehicle terminal devices 1₁ through 1ₙ, the server performs image readout and transmission processing to transmit image data. The details of scenery image control processing and image readout and transmission processing will be described later.

Operation of the routing guide system of this configuration will be described with the processing of the processor 12 and the server 2.

Figure 3:
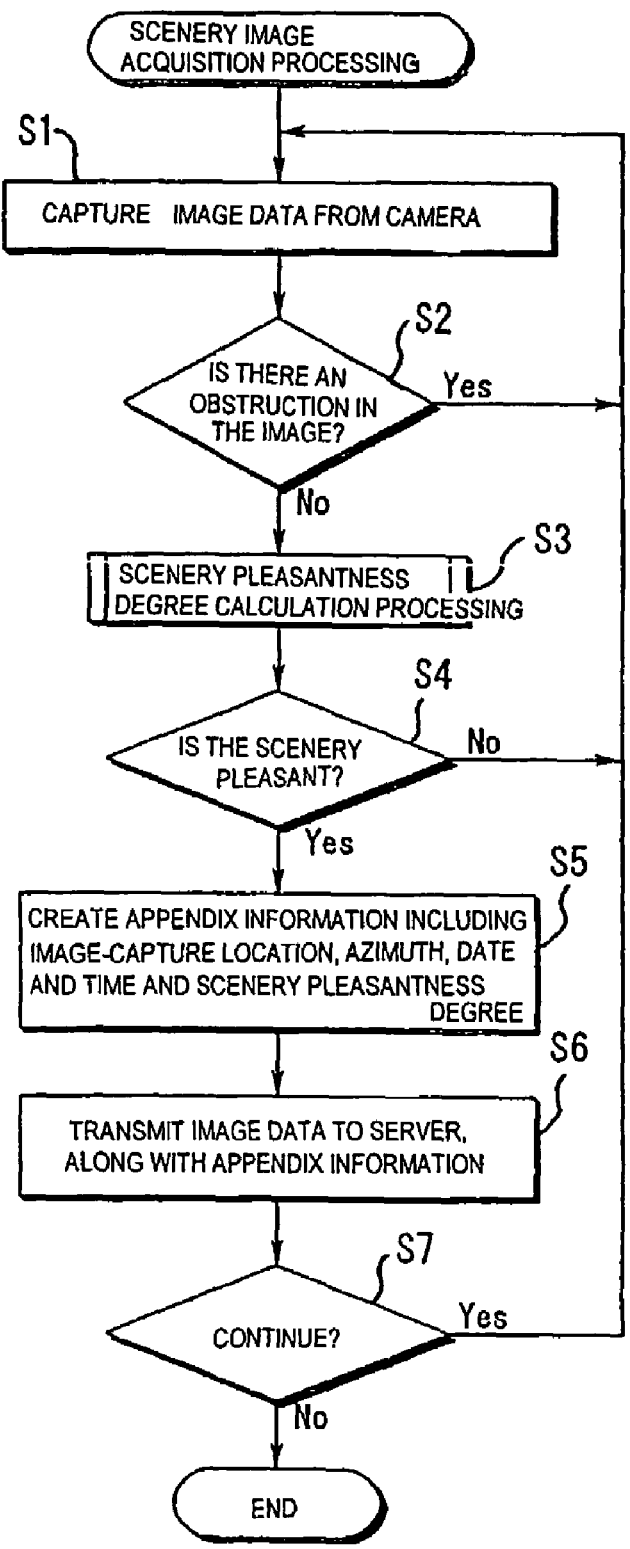
FIG. 3 is a flow chart showing a scenery image acquisition processing.

In the scenery image acquisition processing, as shown in FIG. 3, the processor 12 first captures image data from the camera 11 (Step S1) and determines whether or not any obstruction exists in the image (still picture) shown by that image data (Step S2). An "obstruction" is something other than scenery, such as a vehicle proceeding in front or a parked vehicle. For example, a comparison is made between the most recently captured image data and a plurality of image data captured prior thereto to determine whether there is any obstruction. If an obstruction exists, the processing returns to Step S1 and new image data is captured. Note that, since there are few cases where no obstructions exist at all, the determination in Step S2 may be made on whether or not the total amount of the obstruction portion shown in the image is greater than a threshold value.

If there is no obstruction in the image, degree of scenery pleasantness is calculated according to the scenery image represented by the most recent image data (Step S3).

Figure 4:
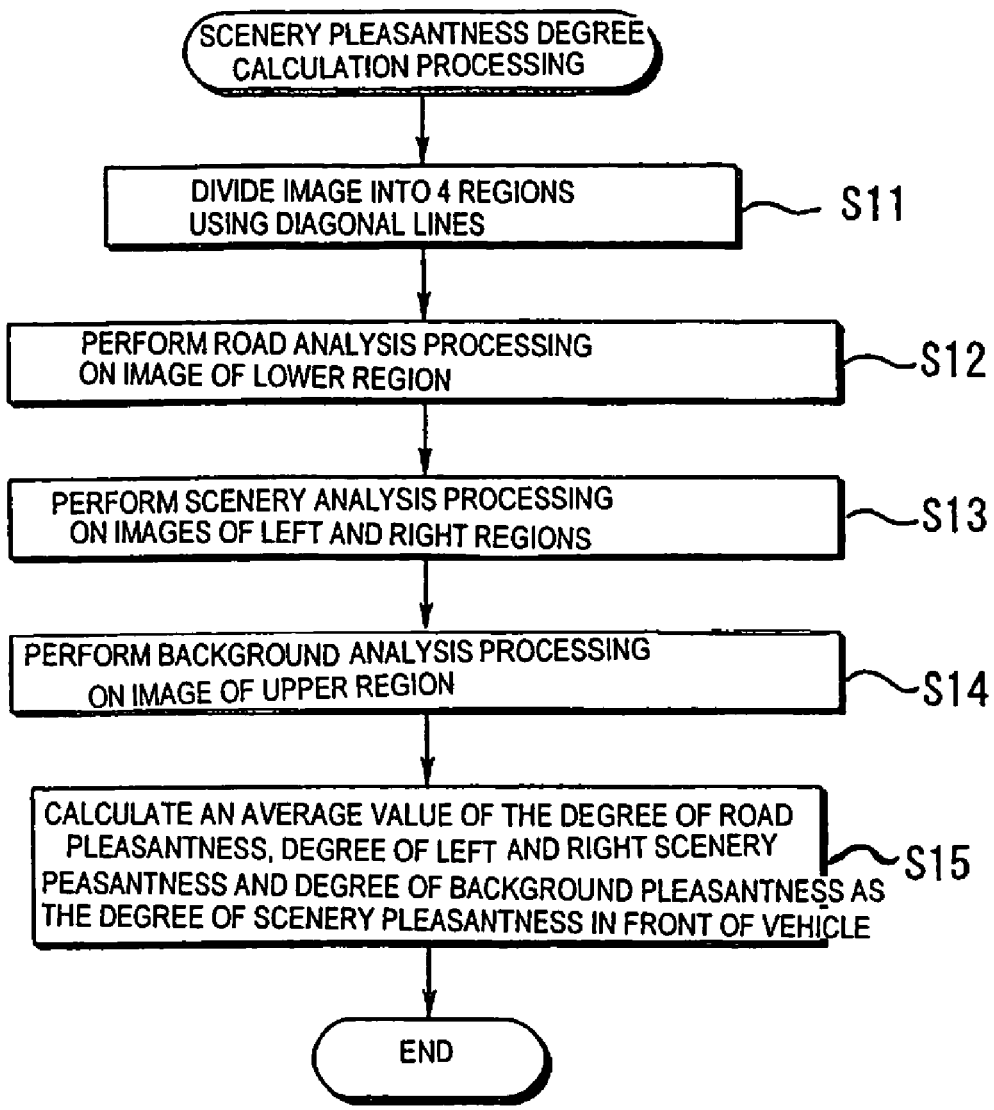
FIG. 4 is a flow chart showing a process of calculating a degree of scenery pleasantness.
Figure 5:
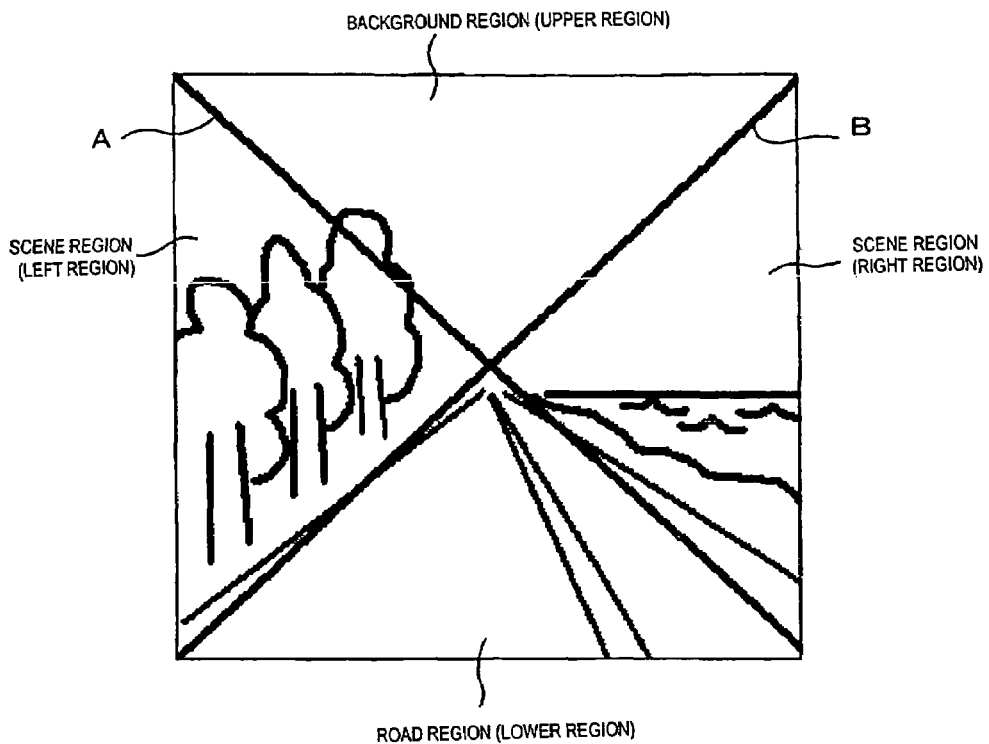
FIG. 5 is a diagram showing division of a scenery image into four parts.

In the calculation processing of the scenery pleasantness degree, the scenery image is divided into four regions by diagonal lines, as shown in FIG. 4 (Step S11). As shown in FIG. 5, the image is a quadrilateral and is divided into four regions (i.e., upper region, lower region, right region and left region) by means of the two diagonal lines A and B. The upper region is recognized as the background region, the lower region is recognized as the road region, and the right and left regions are recognized as the scene regions.

Road analysis is performed according to the image of the lower region (Step S12), scene analysis is performed according to the images of the right and left regions (Step S13), and background analysis is performed according to the image of the upper region (Step S14).

Figure 6:
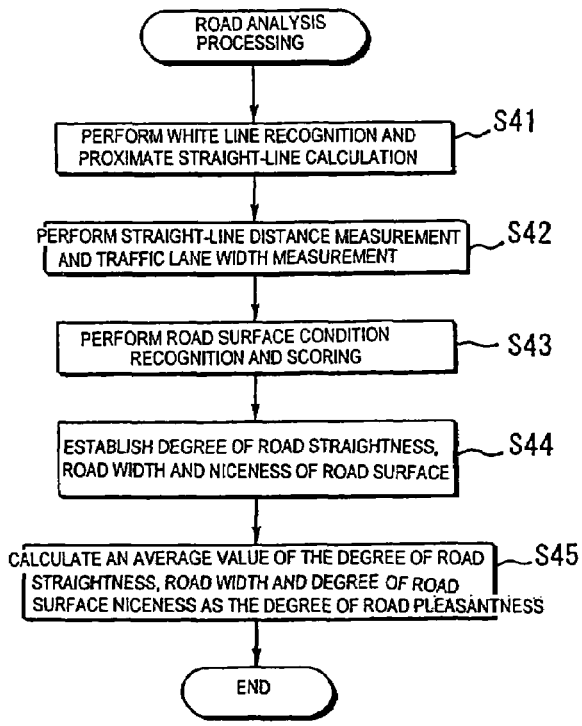
FIG. 6 is a flow chart showing a road analysis processing.

In the road analysis of Step S12, as shown in FIG. 6, white line recognition and proximate straight line calculation are done (Step S41). In other words, the white line on the road is detected and a straight line proximate to that white line is calculated. As a method of white line recognition, there is, for example, the method disclosed in Japanese Patent Application Kokai (Laid-Open) No. 6-333192. The entire content disclosed in Japanese Patent Application Kokai No. 6-333192 is incorporated herein by reference. With this white line recognition method, white line candidate points are extracted based on image data, and the frequency distribution of the angles between the line segments connecting each two points of those white line candidate points and a reference line is found. Then, based on the frequency distribution, the actual angle of the white line with respect to the reference line and the actual candidate points included in the white line are extracted. Based on the actual angle and the actual candidate points, a straight line proximate to the white line is determined.

Next, straight-line distance (length) measurement and traffic lane width measurement are performed (Step S42). In the straight-line distance measurement, a point is found where the recognized white line deviates from the proximate straight line. The distance (length) of the straight line to that point is taken as the straight-line distance (length), and the longer the straight-line distance, the more it is judged a pleasant road that is easy to drive, and a high score is assigned. On the other hand, the more the road has sharp curves and a straight line cannot be approximated, the lower will be the assigned score. As a method of traffic lane width measurement, there is, for example, the method disclosed in Japanese Patent Application Kokai No. 2002-163642. The entire content disclosed in Japanese Patent Application Kokai No. 2002-163642 is incorporated herein by reference. The traffic lane position is identified. Based on the current traffic lane position and its past history, estimation of lane width is performed.

Then, road surface condition recognizing and scoring are done (Step S43). Road surface condition recognition is identifying, through color distribution analysis, whether or not the road surface is paved. Alternatively, road conditions related to weather, such as "dry," "wet," or "snowy," may be recognized. Japanese Patent Application Kokai No. 2001-88636 discloses a method for recognizing road surface conditions such as presence of snow or gravel, and it is acceptable to use this method here. The entire content disclosed in Japanese Patent Application Kokai No. 2001-88636 is incorporated herein by reference. In the scoring, a paved road surface is given a high score while an unpaved road surface is given a low score.

According to the various road parameter values obtained through execution of Steps S41 through S43, the degree of straightness of the road, the width of the road, and the niceness of the road surface are established (Step S44). In other words, the degree of road straightness is established according to the straight-line distance, the road width is established according to the traffic lane width and the niceness of the road surface is established according to the road surface condition value. Depending on the degree of similarity to the respective reference value, a value in the range of 0 to 100 is established for road straightness, road width, and niceness of road surface. Then an average value of the road straightness, road width, and road surface niceness, which were established in Step S44, is calculated (Step S45). This average value indicates the degree of pleasantness of the road region.

Figure 7:
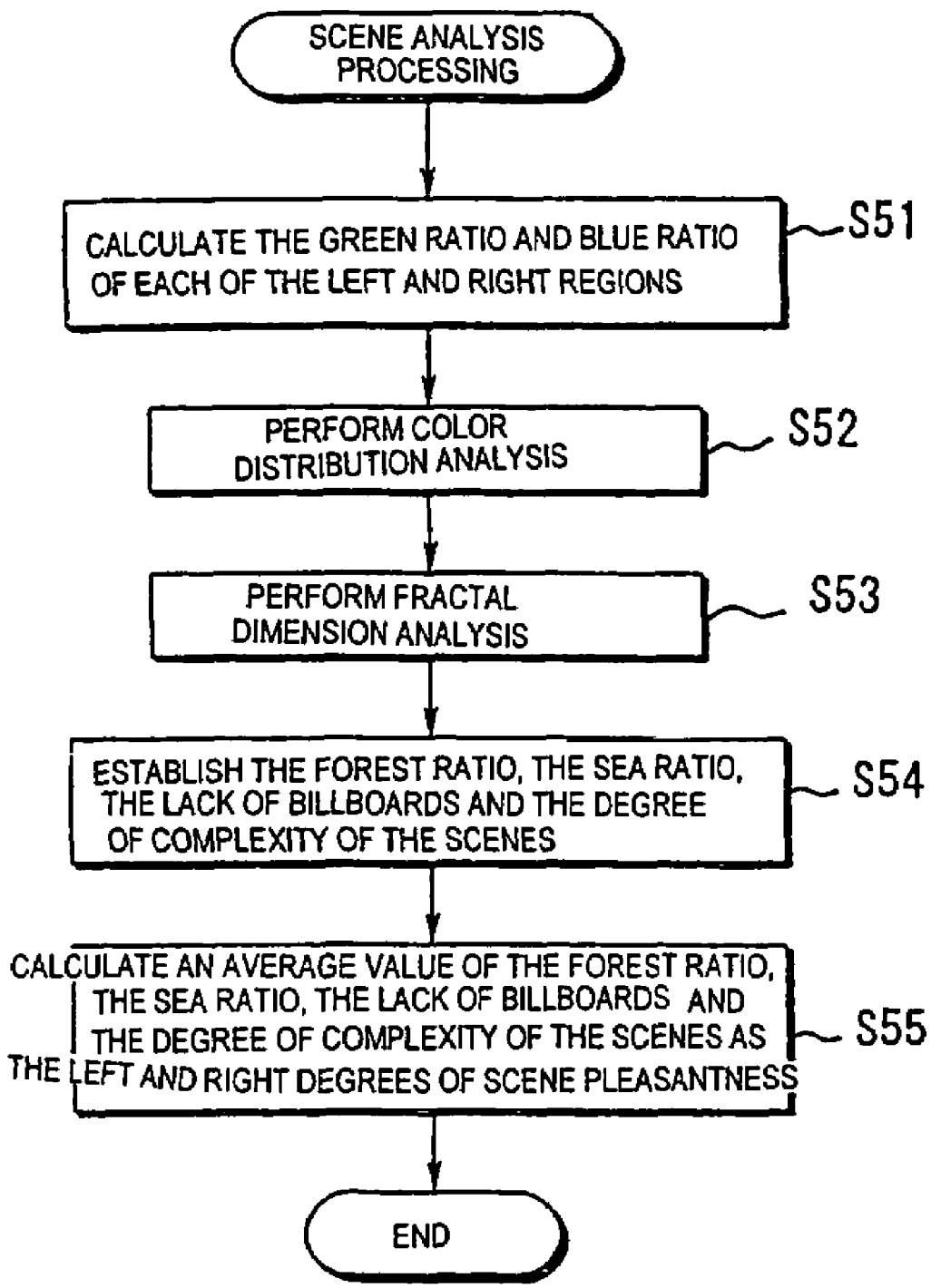
FIG. 7 is a flow chart showing a scene analysis processing.

In the scene analysis processing of Step S13, as shown in FIG. 7, the ratio of green color and ratio of blue color are analyzed for both the right and left regions (Step S51). For each of the right and left regions, the pixel count of the green color portion (including similar colors) within the region is extracted and the ratio of the pixel count of the green portion to the total pixel count within the region is taken as the green ratio. Similarly, for each of the right and left regions, the pixel count of the blue color portion (including similar colors) within the region is extracted and the ratio of the pixel count of the blue portion to the total pixel count within the region is taken as the blue ratio. The green ratio for each of the right and left regions is taken as the forest ratio of that region and the blue ratio for each of the right and left regions is taken as the sea ratio of that region.

Next, color distribution analysis is performed (Step S52). The color distribution is decided by calculating as a histogram the pixel count for each color of each of the right and left regions. Also fractal dimension analysis of each of the right and left regions is performed (Step S53). The quality of the scenery is evaluated by the value of the fractal dimension. Japanese Patent Application Kokai No. 2000-57353 discloses scenery quality evaluation using fractal dimension analysis. The entire disclosure of Japanese Patent Application Kokai No. 2000-57353 is incorporated herein by reference. According to Japanese Patent Application Kokai No. 2000-57353, the value of the fractal dimension ranges from 0 to 2, and the quality of scenery is evaluated as high when in the range of 1.50 to 1.65.

Based on the scene parameters obtained through execution of Steps S51 to S53, the forest ratio, the sea ratio, the lack of billboards and the degree of complexity of the scenes are established (Step S54). Specifically, the forest ratio is decided from the green ratio, the sea ratio is decided from the blue ratio, the lack of billboards is decided from the color distribution, and the degree of complexity is decided from the value of the fractal dimension. A value in the range of 0 to 100 is established for each of the forest ratio, the sea ratio, the lack of billboards and the degree of complexity, depending on the degree of similarity to a reference value for each. Then an average value of the forest ratio, the sea ratio, the lack of billboards and the degree of complexity, which were established in Step S54, is calculated for each of the right and left regions (Step S55). These average values indicate the degrees of the right and left scene pleasantness.

Figures 8, 9, 10:
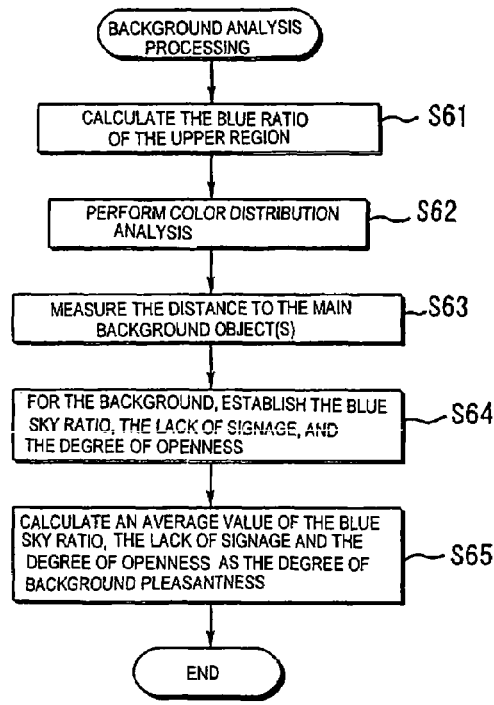
FIG. 8 is a flow chart showing a background analysis processing.
FIG. 9 is a diagram showing items of the road analysis and degrees of road pleasantness obtained by the analysis.
FIG. 10 is a diagram showing items of the scene analysis and degrees of scene pleasantness obtained by the analysis.

In the background analysis processing of Step S14, as shown in FIG. 8, the blue ratio of the upper region is analyzed (Step S61). The pixel count of blue color portion (including similar colors) within the upper region is extracted and the ratio of the pixel count of the blue portion to the total pixel count within the region is taken as the blue ratio. The blue ratio is taken as the ratio of blue sky in the upper region.

Next, color distribution analysis is performed (Step S62). The color distribution is found by calculating as a histogram the pixel count for each color of the upper region, and is used to analyze billboards, overpasses and distant mountains. In addition, distance measurements are performed (Step S63). This is the measurement of the distance to the main background objects, such as sky, distant mountains, overpasses and tunnels, used in the color distribution analysis. Using the image of the frame one before the image just captured, the optical flow is found and the distance to the objects in the region is measured. If the distance is infinite, it is judged that there are no objects. Japanese Patent Application Kokai No. 6-107096 discloses the detection, as an optical flow vector, of the movement of the same point on an object appearing in an image in two frames which are in tandem time-wise, in a series of foreground moving images which have been captured. The entire disclosure of Japanese Patent Application Kokai No. 6-107096 is incorporated herein by reference.

According to the various background parameters obtained through executing Steps S61 through S63, the ratio of blue sky, the lack of signage and the extent of openness of the background are established (Step S64). In other words, levels can be established respectively: the blue sky ratio is decided from the blue color ratio; the lack of signage is decided from the color distribution; and the extent of openness is decided from the distance to the sky, to distant mountains, to land bridges and to tunnels. A value in the range of 0 to 100 is established for each of the blue sky ratio, the lack of signage, and the extent of openness depending on the degree of similarity to a reference value for each. Then an average value of the blue sky ratio, the lack of signage, and the extent of openness, which were established in Step S64, is calculated (Step S65). This average value indicates the degree of background pleasantness.

After the analysis processing in this manner for each region, an average value of the degree of road pleasantness, the degrees of right and left scene pleasantness and the degree of background pleasantness is calculated as the degree of scenery pleasantness in front of the vehicle (Step S15).

Suppose that a vehicle is traveling on a tree-lined, two-lane, straight road. The road analysis processing of Step S12 provides values for the degree of straightness of the road region, the width of the road, the niceness of the road surface, and the degree of pleasantness of the road region, as shown in FIG. 9. As a result of the scene analysis processing of Step S13, for each of the right and left regions, values for the forest ratio, sea ratio, lack of billboards, the degree of scene complexity and the degree of scenery pleasantness are obtained as shown in FIG. 10. As a result of the background analysis processing of Step S14, values for the blue sky ratio, the lack of signage, the extent of openness and the degree of pleasantness of the background are obtained as shown in FIG. 11. The average value of the degree of road region pleasantness of FIG. 9, which is 80, the degree of left scene pleasantness, which is 80, the degree of right scene pleasantness, which is 78.3, both from FIG. 10, and the degree of background pleasantness, which is 83.3, of FIG. 11 is the degree of scenery pleasantness of Step S15, which is 80.4.

After calculating the degree of scenery pleasantness in this manner, a judgment is made, depending on that degree of scenery pleasantness, as to whether or not the scenery is pleasant (Step S4). If the degree of scenery pleasantness calculated in Step S4 exceeds a predetermined threshold value (for example, 70), it is determined that the scenery is pleasant. If it is equal to or less than the predetermined threshold value, it is not determined that the scenery is pleasant. In the case of a judgment of pleasant scenery, information to be appended to the image is created, including the image-capture location, the direction, the date and time and degree of scenery pleasantness for this image data (Step S5). The image-capture location and direction can be obtained from the GPS unit 13, and the date and time can be obtained from calendar and clock provided within the processor 12. Alternatively, in Step S1, the processor 12 may capture image data together with information on image-capture location, direction, date and time, and store that in the storage device 16. Then when Step S5 is executed, that information may be read out and used.

The processor 12 transmits to the server 2 the current image data along with the appended information (Step S6). After the current image data, including the appended information, is made into packet data addressed to the server 2, it is transmitted by the radio device 15 as a radio signal, and that radio signal is received by the communication relay device 4. The communication relay device 4 transmits to the server 2, via the network 3, the packet data carried by the radio signal.

After executing Step S6, it is determined whether or not to continue the scenery image acquisition processing (Step S7). For example, if the continuation is requested by a user who enters a certain input to the operation section 17, the flow returns to Step S1 and repeats the operations of Steps S1 to S7. On the other hand, in the case of not continuing, the scenery image acquisition processing is terminated.

In this way, image data, together with the appendix information thereof, is transmitted to the server 2 by each of the on-vehicle terminal devices $1_1$ through $1_n$. The server 2 executes scenery image management processing in order to process the graphic data sent to it, using the appendix information.

Next is described scenery image management processing performed by the server 2.

Figure 12:
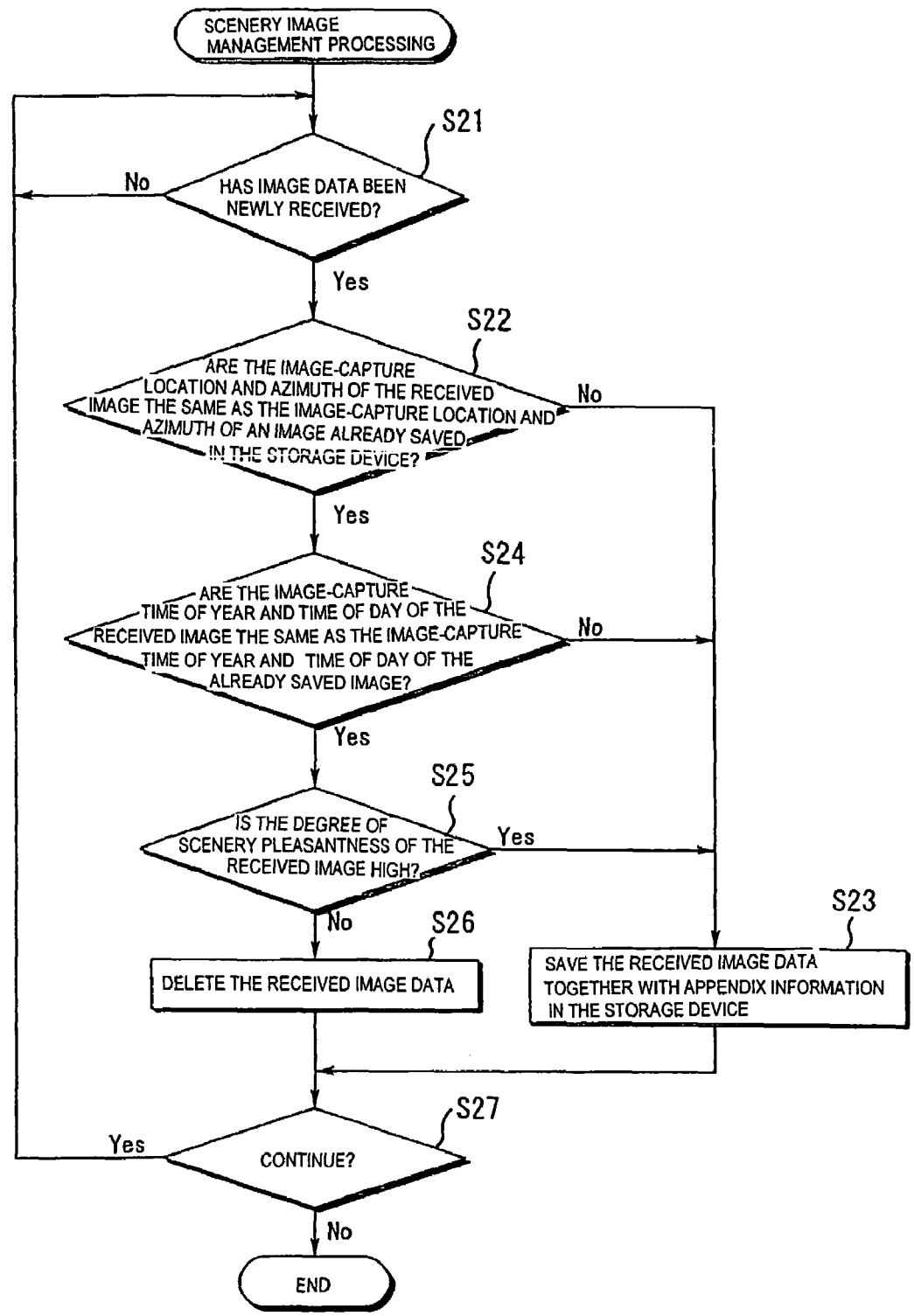
FIG. 12 is a flow chart showing a scenery image control (management) processing.

In the scenery image management processing, as shown in FIG. 12, it is determined whether or not image data has been newly received (Step S21). If image data has been received, it is determined whether or not the image-capture location and direction in the appendix information, which is attached to the received image data, is the same as the image-capture location and direction of already existing image data (image data already stored) (Step S22). In other words, it is determined whether or not there is an image of the same image-capture location and direction among a plurality of scenery images saved as image data in the storage device 21. If the difference of the two image-capture locations is within a predetermined distance (for example, 50 m), they are taken to be identical; and if the difference of the directions is within a predetermined angle (for example, 30 degrees), the directions are taken to be identical. If image data for which the image-capture location and direction are identical to the newly received image data has not been stored in the storage device 21, the new image data along with the appended information is stored in the storage device 21 (Step S23).

If image data whose image-capture location and direction are identical to the newly received image data exists already in the storage device 21, then it is determined whether or not, between the existing image data and the newly received image data, image-capture time of year and time of day are also identical (Step S24). The image-capture time of year is spring (March through May), summer (June through August), autumn (September through November) or winter (December through February), decided based on the date and time in the appendix information; the year being divided into these four. The image-capture time of day is morning (6 a.m. through 10 a.m.), noon (11 a.m. though 4 p.m.), evening (5 p.m. through 7 p.m.) or night (8 p.m. to 5 a.m.), decided based on the date and time in the appendix information; a day being divided into these four hour bands. If, comparing the existing image data and the received image data, either the image-capture times of year or the image-capture times of day are not identical, the received image data along with the appended information is stored in the storage device 21 (Step S23).

If image data whose image-capture time of year and image-capture time of day are identical to the newly received data has already been stored in the storage device 21, it is further determined whether the degree of scenery pleasantness of the existing image data is higher than that of the newly received image data (Step S25). If the degree of scenery pleasantness of the received image data is higher than that of the exiting image data, the received image data along with the appended information is stored in the storage device 21 (Step S23). In this case, the existing image along with its appended information may be deleted from the storage device 21. On the other hand, if the degree of scenery pleasantness of the received image data is lower than that of the exiting image data, the received image is deleted, without being stored in the storage device 21 (Step S26).

After executing Step S23 or S26, it is determined whether or not the scenery image management processing should be continued (Step S27). If a user enters instructions to an operation section (not shown) of the server 2 to terminate the scenery image management processing, the scenery image acquiring processing is terminated. If instructions to terminate scenery image management processing are not given, the flow returns to Step S21 and the operations of Steps S21 through S27 are repeated.

In this way, the image data received from each of the on-vehicle terminal devices $1_1$ through $1_n$ are managed by the server 2. The image data managed at the server 2 are utilized for navigation processing by the processor 12 of each of the on-vehicle terminal devices $1_1$ through $1_n$.

Next is described the navigation processing carried out by the processor 12.

Figure 13:
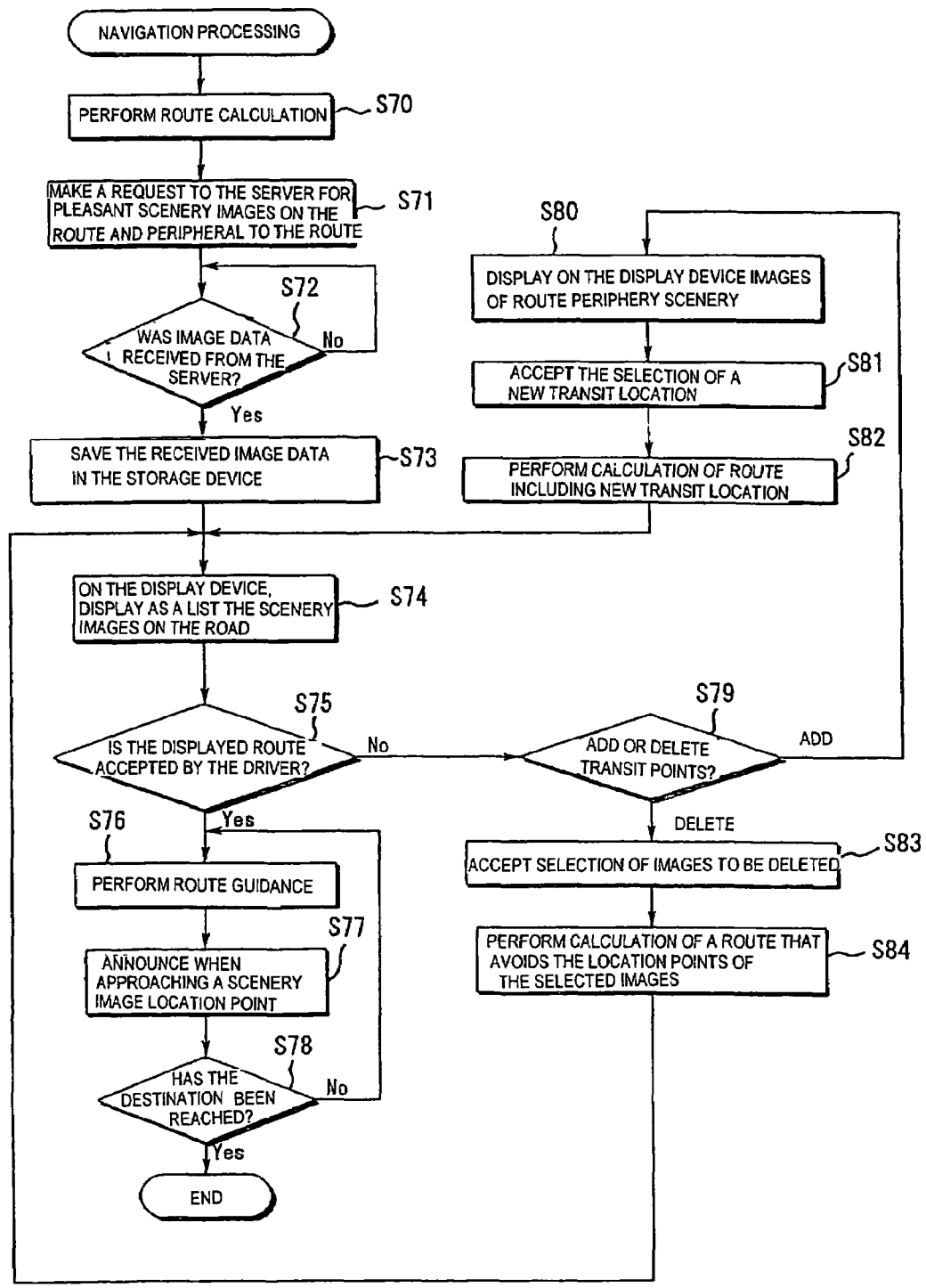
FIG. 13 is a flow chart showing a navigation processing.

For navigation processing, as shown in FIG. 13, first the processor 12 performs route calculation (Step S70). In the route calculation, for example a user enters a certain input to the operation section 17 to specify a destination, and the route from the current position to the destination is calculated according to road data for route searching stored in the storage device 16. The calculated route is displayed on the display device 18 along with a map. It should be noted that the route starting point specified by the driver who operates the operation section 17 may be a location other than the current position of the vehicle.

Upon calculating the route from the current position to the destination, pleasant scenery images on that route and peripheral to the route are requested to the server 2 (Step S71). That request for scenery images, in the same way as the image data, is sent to the server 2 from the radio device 15 via the radio relay device 4 and the network 3.

Figure 14:
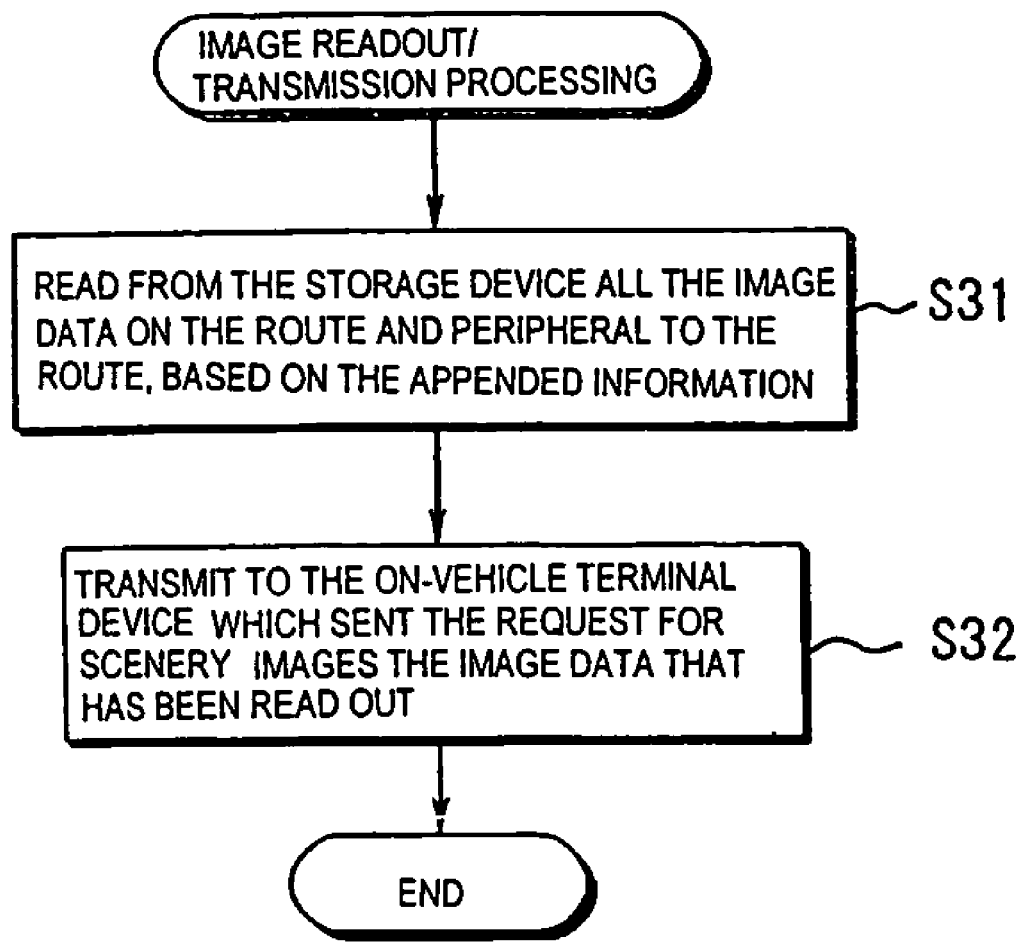
FIG. 14 is a flow chart showing an image readout and transmission processing.

The server 2, upon receiving a request for scenery images, performs image readout and transmission processing, as shown in FIG. 14. In image readout and transmission processing, all the image data on the route and peripheral to the route indicated by the scenery image request are all read from the storage device 21 in accordance with the appended information (Step S31), and the image data thus read out is transmitted to the on-vehicle terminal device which had sent the scenery image request (Step S32). The image data from the server 2 is received by the radio device 15, via the network 3 and the transmission relay device 4. That radio device 15 is a unit inside the on-vehicle terminal device that transmitted the scenery image request. The image data received by the radio device 15 is supplied to the processor 12.

The processor 12 determines whether or not the image data from the server 2 has been received (Step S72). If reception of the image data has completed, the received image data is stored in the storage device 16 (Step S73). Then, from among the image data retained, image data whose image-capture locations are on the calculated route are selected, and the scenery images of the selected image data are displayed in the form of a list on the display device 18 (Step S74). The scenery images may be displayed in a small size (for example, thumbnail size) in locations on the route on the displayed map, or the scenery images may simply be displayed in small size in order from the current position to the destination.

The processor 12 determines whether or not the driver is satisfied with the displayed route (Step S75). For example, when scenery images are displayed in Step S74, a question asking whether or not the displayed route is acceptable to the driver may be simultaneously displayed on the display device 18. In response to this question, the driver of the vehicle performs an input operation by means of the operation section 17 to confirm the route. The determination of Step S75 may be made either during the displaying of the list of scenery images or after the displaying.

If the driver has accepted the displayed route, the route is fixed and the route guidance is started (Step S76). In other words, along with a map, a vehicle mark is displayed on the display device 18, showing the vehicle's current position and direction of travel (i.e., heading direction of the vehicle), while instructions as to lane of travel and right or left turns at intersections are given by voice through a speaker (not shown). This is the same as the route guidance operation of conventional navigation devices. During route guidance, when a scenery image location point is approached, the image of this location point is displayed on the display device 18 and guidance is provided by voice (Step S77). When a vehicle comes within, for example, 50 m of the image-capture location of image data saved in the storage device 16, the corresponding image data is read out and displayed on the display device 18, and notice of approach to that location is provided by voice. Steps S76 and S77 are repeatedly executed until the destination is reached (Step S78).

If it is determined in Step S75 that the driver does not accept the displayed route, a determination is made whether another transit point(s) should be added or any of the displayed transit points should be deleted (Step S79). When the driver does not accept the displayed route, a request is made to the driver, for an action to select either to "add" or "delete", in order to change the route, and this request is displayed on the display device 18. Thus, the driver, through operation of the operation section 17, selects either the addition of another transit point(s) or the deletion of the displayed transit point(s). When adding new transit point(s), image data on the scenery images in the periphery of the route, calculated in Step S70, are read from the storage device 16 and the scenery images of the image data thus read out are displayed on the display device 18 (Step S80). The scenery images of the route periphery may be displayed in a small size in locations on the route in the displayed map, or the scenery images may simply be displayed in small size in order from the current position to the destination. From among the scenery image location points of the displayed route periphery, the driver, by means of the operation section 17, can select new transit locations. Then, the processor 12 accepts the selection of the new transit location(s) (Step S81) and calculates a new route including the specified transit location(s) (Step S82). The number of new transit location(s) is one or plural.

If the deletion of the transit point(s) is selected in Step S79, the drive who operates the operation unit 17 then selects, from among the scenery images displayed in the form of list, the image which should be deleted, that is, the image of the location point(s) to which travel is not desired. As a result, the processor 12 accepts the selection of the image(s) to be deleted (Step S83) and calculates a new route that avoids the location point(s) of that selected image(s) (Step S84). The number of images that can be selected is one or plural.

After the execution of Steps S82 and S84, the flow proceeds to Step S74 and image data is selected, the image-capture locations of which are on the calculated route. The scenery images represented by the selected image data are displayed in the form of the list on the display device 18. Subsequently, Steps S75 through S78 are executed as described above.

In the above-described embodiment, because one can learn of location points having good scenery, one can drive while enjoying scenery. Also, it is convenient when setting a route, because one can confirm the scenery through images. Moreover, if one finds an interesting transit location while viewing images of the route periphery, he or she can add that transit location and establish a new route. Thus, the driver can develop the drive to enjoy scenery. Also, when a vehicle approaches a scenic location during the navigation, the driver is notified of that approach and will not miss wonderful scenery.

The server, based on the images of pleasant scenery acquired from the on-vehicle terminal devices, may automatically create a diagram of the distribution of degree of scenery pleasantness, taking into account the time of year of the image capture. The diagram of the distribution of degree of scenery pleasantness can be downloaded to the on-vehicle terminal device according to an operation by the driver. At the on-vehicle terminal device, regions are selected from the diagram of the distribution of degree of scenery pleasantness, and the driving time at the regions is set. The on-vehicle terminal device automatically selects the location points to be transited, considering time, and thus establishes a route. By displaying scenery images along with a route map, a driver can have a drive in a region of pleasant scenery without worry.

The above-described embodiment does not deal with a case where there is no pleasant scenery on the decided route. In such a case, the route may be automatically changed so that five pleasant scenic location points of the route periphery, for example, are to be transited.

In the above-described embodiment, the route calculating means, the display means and the route confirming means are provided in the on-vehicle terminal device, and the image providing means having the storage means is provided in the server, but it is also satisfactory to provide the image providing means in the on-vehicle terminal device. In other words, without providing a server, the scenery images provided in advance may be stored as data in the on-vehicle terminal device and these scenery images may be selectively displayed on the image display when establishing a route.

When the above-described embodiment calculates the degree of scenery pleasantness, the image in front of the vehicle is divided into four regions by two diagonal lines, but there is no limitation about the number of diagonal lines or the number of regions thus divided up. Also, in regard to the method of calculating the degree of scenery pleasantness it is of course acceptable to employ another method that does not divide the image.

As described above, the present invention can establish a route in a manner such that a pleasant drive can be provided to a driver.

The present invention can be applied to on-vehicle navigation devices, automatic scenery image acquisition devices, and devices for automatically generating distribution maps (diagrams) of the degree of scenery pleasantness.

The present application is based on Japanese Patent Application No. 2004-106186 filed on Mar. 31, 2004, and the entire disclosure thereof is incorporated herein by reference.

What is claimed is:

1. A routing guide system comprising:
a route calculating device configured to calculate a route of a vehicle to a destination;
an image providing device, having a storage device configured to store, as data, scenery images of a plurality of location points, said image providing device configured to read, from said storage device, scenery images on the route calculated by said route calculating device;
a display device configured to display the scenery images on the calculated route generated by said image providing device; and
a route confirming device configured to confirm, as a set route, the route calculated by said route calculating device, according to an operation, during or after display of the scenery images on said calculated route by said display device,
wherein the vehicle is provided with a camera configured to capture scenery images in front of the vehicle, and a pleasantness degree calculating device configured to calculate a degree of pleasantness of each of the scenery images in front of the vehicle captured by the camera,
wherein said pleasantness degree calculating device includes:
a road analyzing device configured to perform road analysis processing on each of the scenery images in front of the vehicle captured by the camera;
a scene analyzing device configured to perform scene analysis processing on each of the scenery images in front of the vehicle;
a background analyzing device configured to perform background analysis processing on each of the scenery images in front of the vehicle;
a road pleasantness calculating device configured to calculate a degree of road pleasantness on the basis of results of said road analysis processing;
a scene pleasantness calculating device configured to calculate a degree of scene pleasantness on the basis of results of said scene analysis processing; and
a background pleasantness calculating device configured to calculate a degree of background pleasantness on the basis of results of said background analysis processing, and
wherein each said scenery image contains appendix information that includes said degree of pleasantness of each said scenery image, and wherein said degree of pleasantness of each said scenery image includes said degree of road pleasantness, said degree of scene pleasantness and said degree of background pleasantness.

2. The routing guide system according to claim 1 further comprising a route guiding device configured to provide guidance on said set route when the set route is confirmed by said route confirming device.

3. The routing guide system according to claim 2, wherein when a current position of said vehicle approaches a location point corresponding to a scenery image on said set route, said route guiding device provides guidance regarding the location point.

4. The routing guide system according to claim 1, wherein said route calculating device includes:
an image selection device configured to select, according to a second operation, an image from among the scenery images on said calculated route displayed by said display device; and
a route correcting device configured to recalculate the route to said destination to avoid a location point corresponding to the image selected by said image selection device.

5. The routing guide system according to claim 1, wherein said image providing device reads, from said storage device, scenery images on the route calculated by said route calculating device or peripheral thereto, and
wherein said route calculating device further includes:
a periphery display device configured to display the scenery images of the calculated route periphery generated by said image providing device;
a second image selection device configured to select, according to a third operation, an image from among the scenery images of said calculated route periphery displayed by said periphery display device; and
a route correcting device configured to recalculate the route to said destination to transit a location point corresponding to the image selected by said second image selection device.

6. The routing guide system according to claim 1, wherein said route calculating device, said display device, and said route confirming device are provided in an on-vehicle terminal device mounted in said vehicle;
wherein the image providing device having said storage device is included in a server positioned outside said vehicle; and
wherein bi-directional communication is carried out between said server and said on-vehicle terminal device.

7. The routing guide system according to claim 6, wherein said on-vehicle terminal device includes:
said camera;
said pleasantness degree calculating device;
a pleasant image determining device configured to determine whether or not the degree of pleasantness calculated by said pleasantness degree calculating device is larger than a predetermined threshold value; and
an appendix information creation device configured to create, for a scenery image determined by said pleasant image determining device to be of a degree of pleasantness larger than the predetermined threshold value, appendix information including location, direction and date and time of the image capture and the degree of pleasantness, and configured to transmit the scenery image along with the appendix information to said server.

8. The routing guide system according to claim 6, wherein said server includes:
a receiving device configured to receive the scenery image along with the appendix information thereof, transmitted from said on-vehicle terminal device;
a comparison device configured to compare the appendix information of the scenery image received by said receiving device with the appendix information of an existing scenery image already saved in said storage device; and
a saving control device configured to save in said storage device, said received scenery image and the appendix information thereof, if the appendix information of the received scenery image is different from the appendix information of the existing scenery image.

9. The routing guide system according claim, 8, wherein said saving control device discards said received scenery image and the appendix information thereof, if the appendix information of the received scenery image is the same as the appendix information of the existing scenery image.

10. The routing guide system according to claim 8, wherein when the degree of pleasantness contained in the appendix information of said received scenery image is higher than the degree of pleasantness contained in the appendix information of the existing scenery image, said saving control device saves in said storage device said received scenery image along with the appendix information thereof even if the appendix information of said received scenery image other than the degree of pleasantness is identical to the appendix information of the existing scenery image.

11. The routing guide system according to claim 7, wherein said pleasantness degree calculating device includes:
- an image dividing device configured to divide an image in front of the vehicle, captured by said camera, into an upper region image, a lower region image, a right region image and a left region image by means of two diagonal lines,
- wherein said road analyzing device performs road analysis processing on the lower region image;
- wherein said scene analyzing device performs scene analysis processing on the right region image and the left region image;
- wherein said background analyzing device performs background analysis processing on the upper region image;
- wherein said pleasantness degree calculating device further includes:
- a road characteristic index device configured to establish a plurality of road characteristic indices, on the basis of results of said road analysis processing;
- a scene characteristic index device configured to establish a plurality of scene characteristic indices for each of said right and left right region images, on the basis of results of said scene analysis processing; and
- a background characteristic index device configured to establish a plurality of background characteristic indices on the basis of results of said background analysis processing,
- wherein said road pleasantness calculating device calculates an average of said plurality of road characteristics indices, as the degree of road pleasantness;
- wherein said scene pleasantness calculating device calculates an average of said plurality of scene characteristics indices for said right region image, as the degrees of right scene pleasantness and calculates an average of said plurality of scene characteristics indices for said left region image, as the degrees of left scene pleasantness; and
- wherein said background pleasantness calculating device calculates an average of said plurality of background characteristics indices as the degree of background pleasantness; and
- wherein said pleasantness degree calculating device further includes an average calculating device configured to calculate an average of said degree of road pleasantness, said degree of right scene pleasantness, said degree of left scene pleasantness, and said degree of background pleasantness as the degree of pleasantness of said scenery image in front of the vehicle.

12. The routing guide system according to claim 2, wherein said route calculating device includes:
- an image selection device configured to select, according to a second operation, an image from among the scenery images on said calculated route displayed by said display device; and
- a route correcting device configured to recalculate the route to said destination to avoid a location point corresponding to the image selected by said image selection device.

13. The routing guide system according to claim 3, wherein said route calculating device includes:
- an image selection device configured to select, according to a second operation, an image from among the scenery images on said calculated route displayed by said display device; and
- a route correcting device configured to recalculate the route to said destination to avoid a location point corresponding to the image selected by said image selection device.

* * * * *